3,681,120
COATING GLASS FILAMENTS

Malcolm D. Wilding, Rugby, England, assignor to Courtaulds Limited, London, England
No Drawing. Filed June 19, 1970, Ser. No. 47,863
Claims priority, application Great Britain, July 21, 1969, 36,543/69
Int. Cl. C03c 25/02
U.S. Cl. 117—119.2      1 Claim

ABSTRACT OF THE DISCLOSURE

Glass filaments are coated with an aqueous solution or emulsion of a phenolic-formaldehyde reaction product and a rubber latex having a temperature below 12° C.

---

This invention relates to improvements in the coating of glass filaments with a bonding composition to improve the bonding of the filaments to natural or synthetic rubber. Filaments having such coatings are useful in the reinforcement of a variety of rubber products, for example as tyre cords or as the reinforcement of timing belts.

The known bonding composition comprises an aqueous solution or emulsion of a phenolic-formaldehyde reaction product and one or more rubber latices. Preferably the phenolic-formaldehyde reaction product is derived from an alkaline reaction of resorcinol and formaldehyde that is a resorcinol-formaldehyde resole; phenolic substances other than resorcinol may be employed so long as the phenolic-formaldehyde reaction product is soluble or emulsifiable in water, curable by heat and compatible with the latex of the composition. Catechol and tertiary butyl phenols have been recommended as alternatives to resorcinol.

The latex component may contain a natural rubber, a synthetic rubber or two or more rubbers. The synthetic rubber latices are exemplified by latices of vinyl pyridine polymer of butadiene-acrylonitrile copolymers of butadiene-acrylonitrile-styrene copolymers, of vinyl pyridine-butadiene-styrene copolymers, of butadiene-acrylonitrile copolymers and of neoprene.

The choice of latex or mixture of latices is dictated by the character of the material to which the coated glass filaments are to be bonded.

Hitherto, the aqueous bonding composition has been applied at ambient temperature to the glass filaments and the coated filaments dried to obtain a veneer of the composition on each filament. This process has its disadvantages, namely that the veneer may be blistered and frequently contains isolated thick patches. Coated multifilament glass yarns are also liable to behave as rod-like structures, resisting bending, due apparently to gross restriction of relative movement of the filaments.

We have lessened the disadvantages by a simple change in the conventional coating procedure.

According to the present invention, a glass filament is coated with a bonding composition as hereinbefore defined by applying the composition at a temperature below the ambient temperature.

Preferbaly the temperature of the bonding composition is below 12° C.

The invention is illustrated by the following example.

EXAMPLE

An aqueous bonding composition was prepared as follows. Six parts of a 10 percent NaOH solution was added to 471 parts of water, followed by 22 parts of resorcinol and 32.4 parts of 37 percent formalin. The mixture was surrounded by a cooling bath maintained at 25 °C., to limit the exothermic rise in temperature and was aged in contact with the bath for 6 hours.

A commercial polyvinyl pyridine latex containing 41 percent by weight of the polymer (488 parts) was diluted with water (6 parts) and 532 parts of the aged resorcinol-formaldehyde adduct solution, the latter component being added gradually over a few minutes to the stirred latex, and the stirring continued for a further 15 minutes.

The bonding composition was filtered through a stainless steel mesh (British Standard Sieve No. 100) and then stored in a refrigerator at 5° C.

A multifilament glass yarn (150s glass count, 10 filaments) twisted to 0.28 turn per centimetre was drawn under tension at 37 metres/minute through the aqueous bonding composition in a trough externally cooled by brine to maintain the binding compositon at between 9° and 10° C. The coated yarn was drawn through a close-fitting die to limit the pickup of the solids included in the composition to between 10 and 20 percent of the weight of the dried yarn.

The glass yarn was taken from the die through a hot-air oven at an average air temperature of 182° C. at the rate of 37 metres/minute, the path length through the oven being 7.3 metres. From the oven, the yarn passed in three turns on a self-advancing reel which drew the yarn through the earlier steps and from the reel to a collection device.

This process ran without trouble for eight hours and the product (coated glass yarn) had virtually no blisters in the coat. The coated yarn also handled well and was more flexible than the stiffer, rod-like structures which resulted from applying the bonding composition at the ambient temperature.

What is claimed is:

1. A process for coating a glass filament with a bonding composition comprising an aqueous solution or emulsion of a phenolic-formaldehyde reaction product and a rubber latex, characterised in that the composition applied to the glass filament is at a temperature below 12° C.

References Cited

UNITED STATES PATENTS

| | | | |
|---|---|---|---|
| 3,367,793 | 2/1968 | Atwell | 117—126 GB |
| 3,437,122 | 4/1969 | Van Gills | 260—846 |

FOREIGN PATENTS

| | | | |
|---|---|---|---|
| 722,767 | 11/1965 | Canada | 260—846 |

WILLIAM D. MARTIN, Primary Examiner

D. COHEN, Assistant Examiner

U.S. Cl. X.R.

117—126 GB